Jan. 3, 1967   T. J. McCUSKER   3,295,512
FOLDABLE SOLAR CONCENTRATOR
Filed May 3, 1963   3 Sheets-Sheet 2

INVENTOR.
THOMAS J. McCUSKER
BY
*A H Oldham*
ATTORNEY

Jan. 3, 1967   T. J. McCUSKER   3,295,512
FOLDABLE SOLAR CONCENTRATOR
Filed May 3, 1963   3 Sheets-Sheet 3

INVENTOR.
THOMAS J. McCUSKER
BY *A.H. Oldham*
ATTORNEY

United States Patent Office 3,295,512
Patented Jan. 3, 1967

3,295,512
FOLDABLE SOLAR CONCENTRATOR
Thomas J. McCusker, Akron, Ohio; granted to National Aeronautics and Space Administration under the provisions of 42 U.S.C. 2457(d)
Filed May 3, 1963, Ser. No. 277,833
10 Claims. (Cl. 126—270)

This invention relates to a foldable solar concentrator, and more particularly to a foldable cone reflector and a collapsible parabolic cylinder reflector located on the axis of the cone, which apparatus utilizes the double reflector principle to achieve solar concentration.

Heretofore it has been known that there have been many and varied ways to utilize solar power, and there have been many forms of solar concentrators. Particularly with the on-rush of the space age, it becomes necessary to utilize solar concentrators to create electric power in space. However, the utilization of solar energy for the generation of electrical power in space becomes more difficult as electric power requirements increase. These problems may include large weight and size of equipment, complex erection mechanisms, control problems caused by high moments of inertia, difficulty in the process control in the fabrication of large paraboloidal shapes, and interference with telemetry and reconnaissance because of large collection areas. Because of these problems, mainly the weight and size problems, solar power conversion systems have not received much consideration for use in the region of high electrical energy generation.

It is the general object of the invention to avoid and overcome the foregoing difficulties of prior art practices by the provisions of a double reflector system which is foldable for easy packaging, which can readily be formed to size and positioned where desired, which is extremely light weight and which utilizes no large parabolically curved areas which can easily become distorted.

A further object of the invention is to provide a solar concentrator which is extremely effective for providing solar energy conversion for large amounts of electrical energy, and which is light in weight and extremely stable.

Another object of the invention is to provide a solar concentrator which is easily manufactured, durable, highly effective, and low in cost.

A further object of the invention is to provide a solar concentrator wherein the parts are made from an electronic wave transparent material so the concentrator will not interfere with telemetry and reconnaissance.

A further object of the invention is to provide a solar concentrator which is highly effective yet extremely light in weight so that no high moments of inertia are involved to complicate attitude control problems.

The aforesaid objects of the invention, and other objects which will become apparent as the description proceeds are achieved by providing in an apparatus for concentrating solar energy the combination of an open cone reflector made of a flexible sheet having an inner surface highly reflective to solar rays, an inflatable ring supporting the top of the cone, a heat receiver means, means to mount the heat receiver means at the opening to the cone on the axis of the cone, a parabolic column reflector, means to mount the column reflector on the heat receiver means so that it extends into the dish on the axis of the cone substantially to the apex of the cone, the column reflector having a reflective surface achieved by the revolution of a plurality of elements of parabolas having their axes of revolution coincident to the axis of the column, and the column reflector having a virtual image in the cone reflector as viewed from the heat receiver means of a conventional paraboloidal reflector with a fresnel type surface having its image focused on the heat receiver means.

For a better understanding of the invention reference should be had to the accompanying drawings, wherein.

Figure 1:
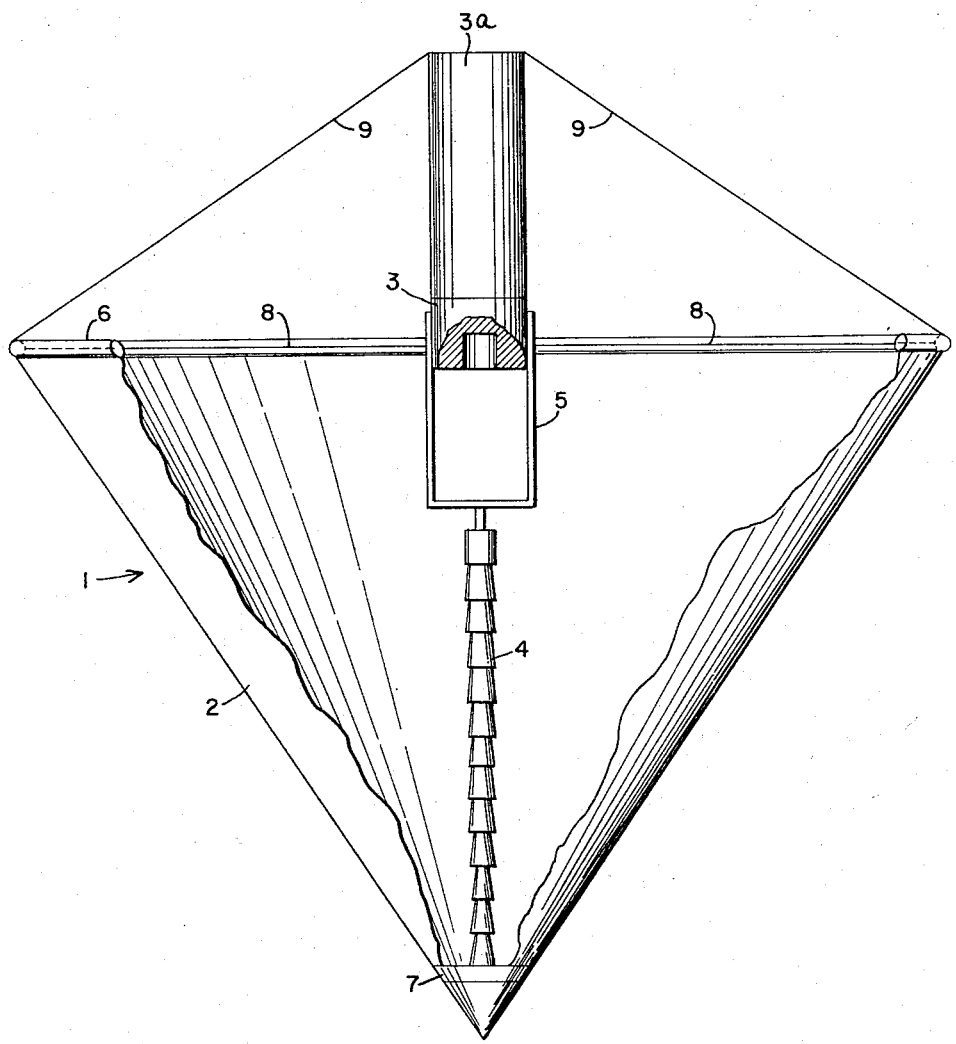
FIGURE 1 is a plan view, partially broken away, to show the structural features of one embodiment of the invention.

With specific reference to the form of the invention illustrated in FIGURE 1 of the drawings, the numeral 1 indicates generally a foldable solar concentrator comprising an open cone reflector 2, a heat receiver 3, a payload 3a, and a shaped column reflector 4. The heat receiver 3 and payload 3a mount the column reflector 4 by means of a trident column support 5. The cone reflector 2 is supported at its open end by an inflatable ring 6, such as a foam inflated torus. An inflatable ring 7 supports the apex of the cone reflector 2 and mounts the end of the column reflector 4. In order to maintain the upper portion of the cone reflector 2 in proper relation to the heat receiver 3 and payload 3a, a plurality of flexible ring support spokes 8, and flexible guide support wires 9 are provided between the inflatable ring 6 on the cone reflector 2 and the heat receiver 3, and the payload 3a respectively.

The cone reflector 2 is made of thin flexible material such as "Mylar," made by the E. I. du Pont de Nemours and Company of Rochester, New York. This cone 2 has a highly reflective inner surface usually taking the form of a thin aluminum coating vacuum deposited thereon, all in a known manner. Therefore, the cone reflector 2 has curvature in only one direction which makes it possible to use a lightweight flexible material such as "Mylar" which can be folded and then stretched into position between the inflatable rings 6 and 7, with no damage or change in curvature to the reflective inner surface.

Figure 2:
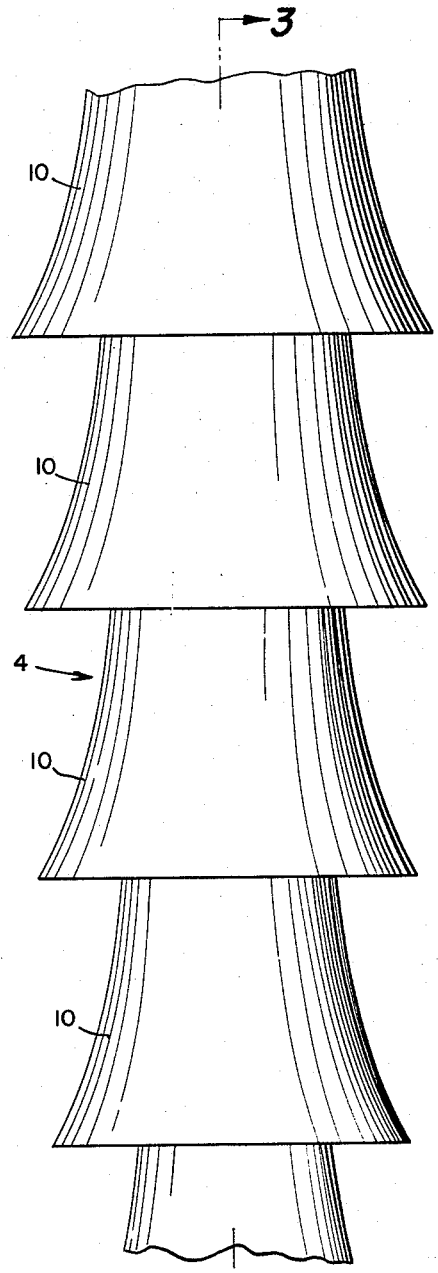
FIGURE 2 is an enlarged fragmentary section of the column reflector of FIGURE 1.

The shaped column reflector 4, utilizes a plurality of elements 10 having double curvature reflective surfaces 10a, as most clearly seen in FIGURE 2. The surfaces 10a are formed corresponding to the revolution of a plurality of elements of increasingly sloping parabolas, with the axes of revolution coincident to the axis of the column 4. The elements 10 must be formed to shape, and thus are not foldable. However, the invention contemplates that the elements 10 be made with ever decreasing diameters toward the apex of the cone 2, as shown in FIGURE 1, to permit telescoping of the elements 10 to a collapsed position for storage.

Figure 3:
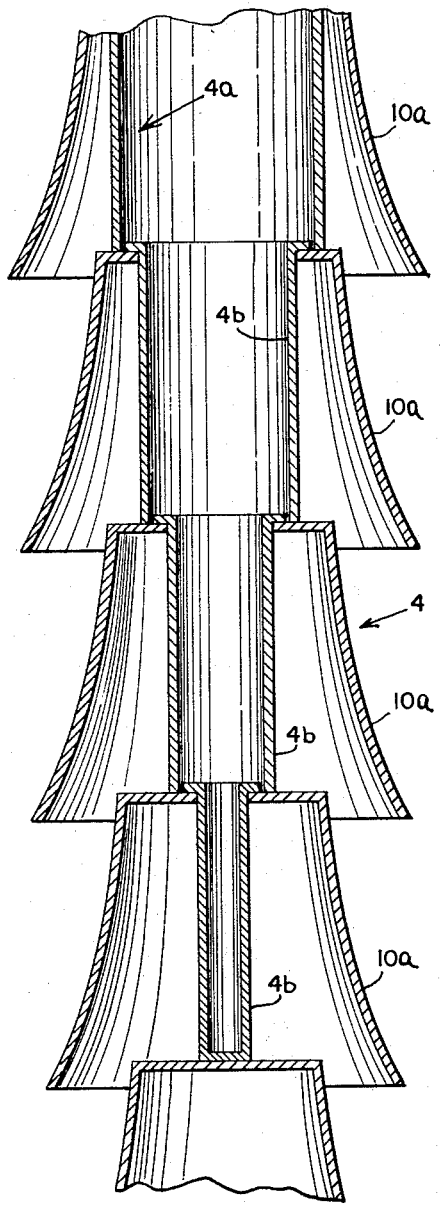
FIGURE 3 is an enlarged fragmentary section of the column reflector taken on line 3—3 of FIGURE 2.

Apparatus to effect the telescoping could take various forms, one of which is shown in FIGURE 3, wherein a telescoping column, represented generally by numeral 4a, comprises a plurality of segments 4b to which the elements 10 are attached as shown. Various pressure means could be used to push column 4a to the extended position.

Figure 5:
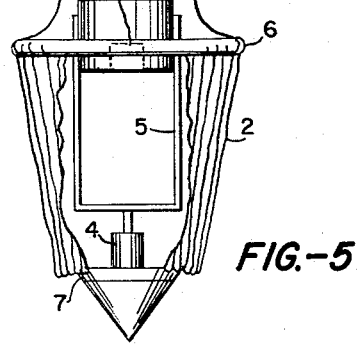
FIGURE 5 is a plan view showing the concentrator in the packed or folded position.

When the concentrator is packaged, it appears as shown in FIGURE 5, wherein the column reflector 4 has been telescoped and the inflatable ring 6 fits snugly around the frame 5 connecting the column 4 to the heat receiver 3. In this packaged configuration, the cone reflector 2 is neatly folded and forms a very small package which will readily snap into position when the column 4 is opened and the support rings 6 and 7 inflated. The invention contemplates that when the concentrator is placed in the working position the column reflector 4 will hold the inflated support rings 6 and 7 apart sufficiently to cause the reflector 2 to be slightly stretched to remove any crinkles formed in the folding, to thereby achieve the desired reflective surface on the aluminum coated cone reflector 2.

A method of packaging collapsed on earth and then expanding this apparatus in space might comprise the steps of mounting the receiver 3 on the apparatus, telescoping a parabolic column reflector 4 with its axis coincident to the axis of the receiver 3 and with the reflector 4 attached at one end to the receiver, providing a fabric-like concentrator reflector cone 2 having an inflatable ring 6 around the base of the cone 2, connecting the ring 6 with flexible guy elements 8 in centered relation to the receiver 3, apparatus and collapsed reflector 4, connecting the apex of the cone 2 to the other end of the reflector 4, folding the cone 2, ring 6 and guy 8 elements around the receiver 3, apparatus and reflector 4 to form a package, shooting the package into space, inflating the ring 6 with a pressure medium to position it around the receiver 3, apparatus and reflector 4 and substantially at right angles to the axis of the receiver 3 and reflector 4, telescoping outwardly the reflector 4 to move the apex of the cone 2 to hold the cone 2 expanded and to position the reflector 4 on the axis of the cone 2.

Figure 4:
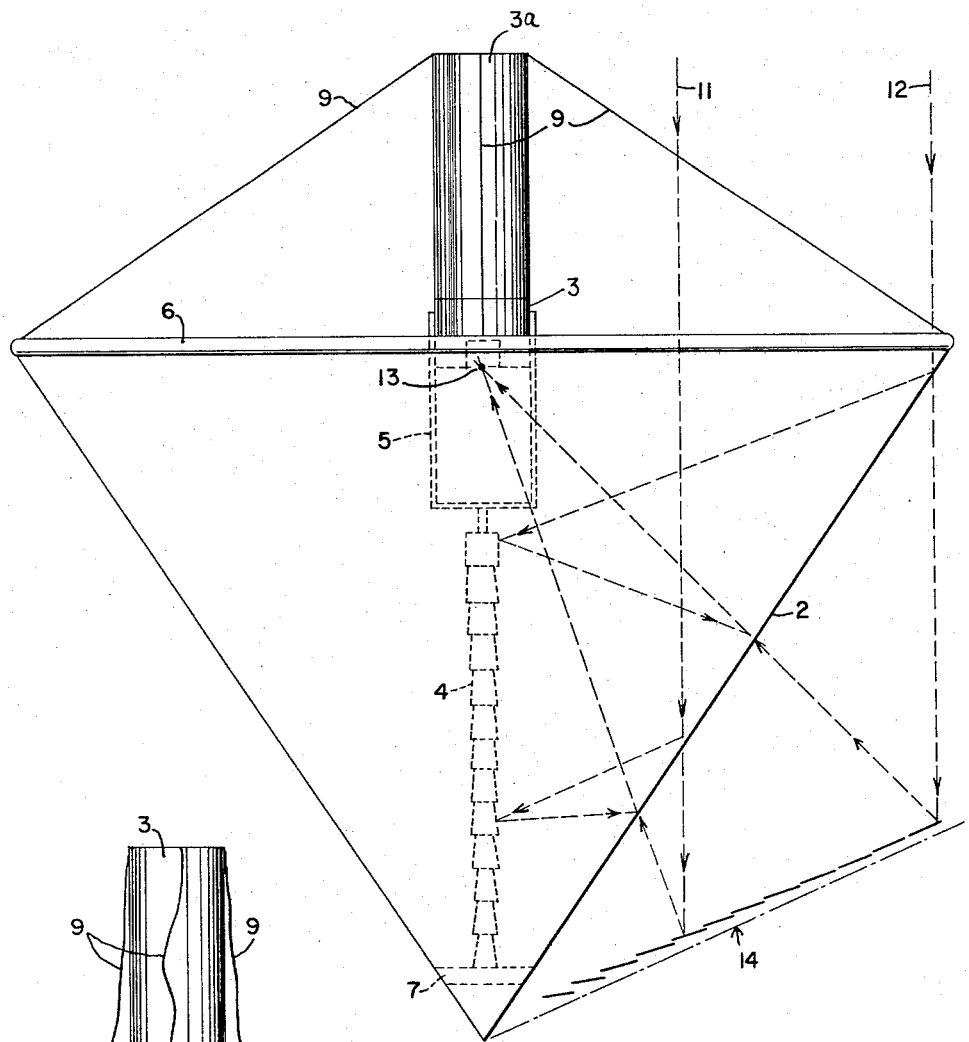
FIGURE 4 is a plan view similar to FIGURE 1, but not broken away, showing how solar rays parallel to the axis of the concentrator are reflected to a focal point on the heat receiver.

The reflective sequence is seen in FIGURE 4, wherein solar radiation, indicated by rays 11 and 12, strike the cone reflector 2, is reflected to the column 4, then back to the cone 2, then to a focal point 13 on the heat receiver 3. The virtual image of the column reflector 4 in the cone reflector 2 when viewed from the focal point 13 on the heat receiver 3 appears to be a conventional paraboloidal reflector with a fresnel-type surface having its focal point on the receiver 3 and is indicated generally by numeral 14. Therefore, in effect, the cone and column construction achieves the same reflection focus as would be achieved by utilizing a conventional paraboloidal reflector with a fresnel-type surface. Note how the rays 11 and 12 if extended to the column virtual image 14 reflect to coincide with the second reflection off the cone reflector 2.

Obviously, a disadvantage of the double-reflector concentrator 1 disclosed in the power loss associated with the two additional reflections required. This will usually amount to about 20% of the incident energy and must be compensated for by an increase in diameter of about 10%. However, the weight reduction achieved utilizing the cone and column double-reflector concentrator has many practical advantages over its optical equivalent, the paraboloidal dish. The primary advantage is in weight and size reduction. As an example of the size reduction possible, the diameter of the column 4 required is only about 3.5% of the diameter of the image 14 representing the paraboloidal dish reflector and the column height is only about half the diameter of the image 14. Thus, for a typical case, the surface area of the column 4 is only about 7% of the surface area of the image 14. A weight savings is effected in the column also because of the reduced size.

The surface area of the conne reflector 2 is about 180% of the frontal area of the image 14. Obviously, a lightweight, flexible material such as Mylar, utilized for the cone reflector 2, could not be utilized to achieve the double curvature necessary in a conventional paraboloidal dish reflector. Thus, although the cone reflector 2 has a larger area than the image 14, its lightweight and flexible qualities are a considerable advantage in weight and adaptability over the conventional paraboloidal dish reflector.

The cone-and-column double-reflector concentrator 1 can be built having specific weights of $1/10$ to $1/20$ of a pound per square foot which represents a weight savings of 80% to 90% over conventional foldable paraboloidal dish reflectors. In most cases this weight savings will more than compensate for the 20% performance loss.

An indirect advantage of the very lightweight concentrator is that their use makes system efficiency a less significant parameter so that higher radiator temperatures become practical with a corresponding saving in radiator weight.

Further, if a material such as aluminized Mylar is used for the cone reflector 2, there is a good possibility that it will be sufficiently transparent to telemetry signals and electronic waves to offer significant advantages in the placement of this equipment on board the vehicle to send or receive signals.

Also, thermal distortion problems in the double-reflector concentrator will normally be less than those encountered in other types since thin wall construction of both reflector elements will produce fast thermal response and will practically eliminate front-to-back thermal gradients.

Obviously, as with all solar concentrators, for maximum efficiency and proper utilization the cone reflector 2 must be properly orientated to the sun so that the sun's rays enter the reflector 2 parallel to the axis of the column reflector 4. Also, as the apex angle of the cone reflector 2 is varied, the individual paraboloidal segments 10 of the column reflector 4 must be correspondingly changed to provide proper focal point achievement with the heat receiver 3. The invention contemplates that the apex angle of the cone reflector 2 be somewhere in the range of 60° to 80° to provide the optimum results. As the angle of incidence of the sun's rays varies from the optimum, the focal point will shift, with a corresponding loss in efficiency. However, since the apparatus is light the attitude control problem is greatly simplified because high moments of inertia are not encountered.

It will be recognized that the objects of the invention have been achieved by a solar concentrator employing a unique two-reflector optical system. The two reflector elements are a cone 2 and a shaped column 4 mounted on the longitudinal axes of the cone 2. Solar radiation incident on the cone parallel to the longitudinal axis of the cone is reflected to the column 4, then reflected back to the cone 2 and then reflected to a focal point on the heat receiver 3 which is located on the longitudinal axis of the cone 2 above the shaped column 4. The shaped column 4 is a surface of revolution of elements of parabolas having their axes parallel to the incident solar radiation and having their focal points coincident with the image of a standard paraboloidal dish concentrator focal point in the cone reflector 2. The shaped column 4 is made up of elements 10, successively diminishing in diameter towards the apex of the cone, thereby permitting the column to be telescoped for compact stowage. The cone reflector is made of thin flexible reflecting material, such as aluminized Mylar, and is readily folded for stowage. The cone 2 is held in position by a ring 6, such as a foam inflated torus which can be in space. The ring 6 is supported by flexible tension spokes 8 and the guide lines 9 eminating from the heat receiver 3 and the payload 3a. The apex of the cone 2 is attached to an inflatable ring 7, which ring mounts the end of the shaped column 4. Thus, a highly effective, extremely lightweight, foldable solar concentrator has been provided to achieve the objects of the invention.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In an apparatus for concentrating solar rays at a focal point for energy conversion the combination of
a heat receiver adapted to receive a focused concentration of solar rays thereon,
an open cone reflector mounted on the heat receiver so that the receiver is on the axis of the cone reflector and substantially in the plane of the base of the cone reflector, a shaped column reflector mounted to the receiver and extending inside the cone reflector on the axis of the cone reflector, said shaped column reflector having a reflective surface achieved by the revolution of a plurality of elements of parabolas having their axes of revolution coincident to the axis of the column, said column reflector surfaces arranged in relation to the cone reflector so that solar rays entering the cone reflector parallel to the axis thereof will reflect from the cone reflector to the column reflector back to the cone reflector and thence to a focus point on the heat receiver.

2. In an apparatus for concentrating solar rays at a focal point for energy conversion the combination of a heat receiver, an open cone reflector mounted on the heat receiver so that the receiver is on the axis of the cone reflector and substantially in the plane of the base of the cone reflector, a paraboloidal shaped column reflector mounted to the receiver at one end and extending inside the cone reflector on the axis thereof and mounted to the apex of the cone reflector, said shaped column reflector having a reflective surface achieved by the revolution of a plurality of elements of parabolas having their axes of revolution coincident to the axis of the column, said shaped column reflector having a virtual image in the cone reflector as viewed from the heat receiver of a conventional paraboloidal dish reflector with a fresnel-type surface having its real image focal point on the receiver.

3. In an apparatus for concentrating solar rays at a focal point for energy conversion the combination of a heat receiver, an open cone reflector mounted on the heat receiver so that the receiver is on the axis of the cone reflector and substantially in the plane of the base of the cone reflector, a column reflector mounted to the receiver at one end and extending inside the cone reflector on the axis thereof and mounted to the apex of the cone reflector, said column reflector being formed of a plurality of stacked parabolic reflectors each concentric with the column axis, said column reflector having a virtual image in the cone reflector as viewed from the heat receiver of a conventional paraboloidal dish reflector having its real image focal point on the receiver.

4. In an apparatus for concentrating solar energy the combination of an open cone reflector made of a flexible sheet material having an inner surface highly reflective to solar rays,
   inflatable rings supporting the base and apex of the reflector,
   a heat receiver means,
   means to flexibly mount the heat receiver means substantially in the plane of the open base of the cone reflector and on the axis of the cone reflector,
   a column reflector having a plurality of axially coincident parabolic surfaces stacked to form the column,
   means to mount said column reflector on one end to the heat receiver means and on the other end to the ring supporting the apex of the reflector and said column reflector being on the axis of the cone reflector, with said mounting of the column effecting a spreading action between the supporting rings for the cone reflector to thereby hold the cone reflector in a stretched position, and said column reflector having a virtual image in the cone reflector as viewed from the heat receiver means of a conventional paraboloidal dish reflector with a fresnel type surface having its real image focal point on the receiver means.

5. In an apparatus for concentrating solar energy the combination of an open cone reflector having an inner surface highly reflective to solar rays,
   rings supporting the open base and apex of the reflector,
   a heat receiver means,
   means to mount the heat receiver means substantially in the plane of the open base of the cone reflector and on the axis of the cone reflector,
   a shaped column reflector means having a virtual image in the cone reflector as viewed from the heat receiver means of a conventional dish reflector having its real image focal point on the receiver means, and means to mount said column reflector means on one end to the heat receiver means and on the other end to the ring supporting the apex of the reflector and said column reflector being on the axis of the cone reflector.

6. In a double reflector solar concentrator the combination of a cone reflector having an opened bottom with a highly reflective inner surface, said reflector being flexible and foldable,
   a heat receiver flexibly mounted on the axis of the cone reflector substantially in the plane of the open bottom to the cone reflector,
   a shaped column mounted on one end to the receiver and on the other end to the apex of the cone reflector, said column coinciding with the axis of the cone reflector,
   said column comprising a plurality of spaced, axially-coincident elements having highly reflective outer surfaces each formed corresponding to the revolution of an element of a parabola with the axes of revolution coincident to the axis of the column, said elements successively diminishing in diameter from the receiver mounted end towards the apex mounted end to permit telescoping of the elements,
   said column effecting longitudinal support for the cone reflector and maintaining the cone reflector in a stretched condition, and said column as viewed from the receiver having a virtual image in the cone reflector of a conventional paraboloidal dish reflector having its real image focal point at the receiver.

7. In a double reflector solar concentrator the combination of a cone reflector having an open bottom with a highly reflective inner surface,
   a heat receiver mounted on the axis of the cone reflector substantially in the plane of the open bottom to the ocne reflector,
   a shaped column mounted on one end to the receiver and on the other end to the apex of the cone reflector, said column coinciding with the axis of the cone reflector,
   said column comprising a plurality of end to end elements having highly reflective outer surface each formed corresponding to the revolution of an element of a parabola with the axes of revolution coincident to the axis of the column,
   said column effecting longitudinal support for the cone reflector and maintaining the cone reflector in a stretched condition, and said column as viewed from the receiver having a virtual image in the cone reflector of a conventional paraboloidal dish reflector having its real image focal point at the receiver.

8. In an apparatus for concentrating solar rays at a focal point on a heat receiver for energy conversion the combination of an open cone reflector having a highly reflective inner surface, a heat receiver, the heat receiver being positioned substantially centrally of the base of the cone and looking into the cone, and a shaped column reflector means mounted in the cone reflector on the axis thereof, said column reflector means as viewed from the receiver having a virtual image in the cone reflector of a conventional paraboloidal dish reflector having its focal point at the receiver.

9. The combination in a solar concentrator of a heat receiver, a heat driven apparatus connected to the receiver, a telescoped parabolic column reflector with its axis coincident to the ray-receiving axis of the receiver and having one end attached to the receiver, a fabric-like concentrator reflector cone, an inflatable ring around the base of the cone, flexible guy elements connecting the ring to the receiver to hold the receiver centered in the ring when the ring is expanded, means connecting the apex of the cone to the other end of the telescoped reflector, said cone, ring and guy elements being folded around the receiver, apparatus, and reflector to form a package means for inflating the ring with a pressure medium to position it around the receiver, apparatus and reflector and substantially at right angles to the axis of the receiver and reflector, and means to outwardly telescope the reflector to move the apex of the cone to hold the cone expanded and to position the reflector on the axis of the cone.

10. The combination of a ray receiver, a flexible fabric-like reflector cone folded about the receiver, means for moving the base of the cone to and for holding it in a position concentric to the receiver and at right angles to the axes thereof, and means for moving the apex of the cone into taut relation with the base, said last-named means being positioned on the axis of the cone and having a plurality of axially spaced parabolic reflectors thereon.

References Cited by the Examiner
FOREIGN PATENTS
126,910   11/1878   France.

CHARLES J. MYHRE, *Primary Examiner.*
JAMES J. WESTHAVER, *Examiner.*
BENJAMIN A. BORCHELT, *Assistant Examiner.*